June 10, 1952  H. L. McCLAIN ET AL  2,599,853
MULTIPLE-UNIT MUFFIN PAN
Filed Jan. 27, 1951
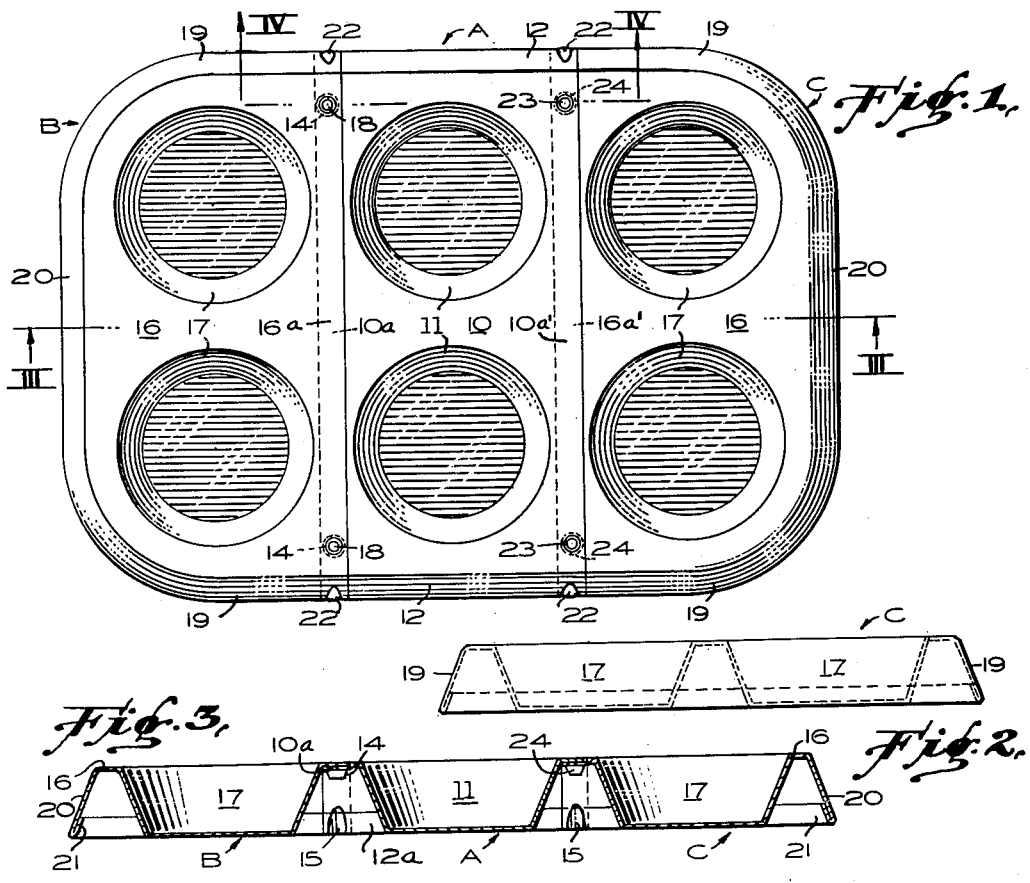
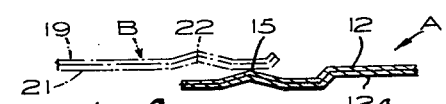
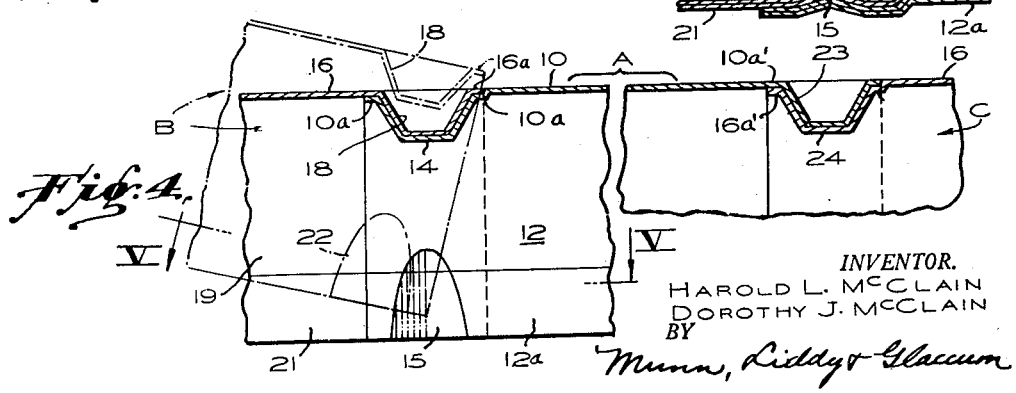
INVENTOR.
HAROLD L. McCLAIN
DOROTHY J. McCLAIN
BY Munn, Liddy & Glaccum
ATTORNEYS Patented June 10, 1952

2,599,853

UNITED STATES PATENT OFFICE 2,599,853

MULTIPLE-UNIT MUFFIN PAN

Harold L. McClain and Dorothy J. McClain, Walnut Creek, Calif.

Application January 27, 1951, Serial No. 208,158

5 Claims. (Cl. 220—23.4)

The present invention relates to a multiple-unit muffin pan. It pertains to the class of culinary utensils used for baking muffins, or other small cakes. The invention consists of the combinations, constructions, and arrangement of parts, as hereinafter described and claimed.

An object of our invention is to provide a multiple-unit muffin pan, which is made up of a plurality of baking units that may be readily connected together. Thus, baking units may be added, or removed, in order to afford the desired number of baking receptacles. It is a well-known fact that the empty or unused receptacles will char when the pan is subjected to a baking heat. We overcome this charring, or scorching, of the pan by eliminating those receptacles that are not required for a particular baking operation.

Moreover, we propose to provide a muffin pan of the character described, which is simple in construction, durable and sturdy for the purpose intended, and readily assembled or disassembled. The units are adapted to be nested one within the other when they are disconnected so as to occupy a small storage space. The parts are made for easy cleaning thereof.

Other objects and advantages will appear as the specification proceeds, and the novel features of the invention will be pointed out in the claims hereunto appended.

Drawing

For a better understanding of our invention, reference should be had to the accompanying drawing, forming part of this application, in which:

Figure 1 is a top plan view of our multiple-unit muffin pan;

Figure 2 is an end elevational view thereof;

Figures 3 and 4 are vertical sectional views taken along the planes III—III and IV—IV, respectively, of Figure 1;

Figure 5 is a horizontal sectional view taken along the line V—V of Figure 4, illustrating terminal and central baking units being connected together; and Figure 6 is a view similar to Figure 5 after the two units have been interconnected.

While we have shown only the preferred form of our invention, it should be understood that various changes, or modifications, may be made within the scope of the annexed claims without departing from the spirit thereof.

Detailed description

Referring to the drawing, it will be noted that Figures 1 and 2 disclose a muffin pan composed of a central baking unit A and a pair of terminal baking units B and C. As the specification continues, it will be apparent that the number of these units may be increased, or decreased to meet the baking requirements.

In its structural features, the central unit A includes a top plate 10 having muffin receptacles 11 formed integral therewith. Also, lateral marginal flanges 12 extend downwardly from opposing sides of the central unit, with these flanges sloping downwardly and outwardly relative to the top plate. The left-hand marginal section 10a of this top plate is offset downwardly, as disclosed in Figures 3 and 4. Conical-shaped sockets 14 are fashioned in the offset section 10a, with these sockets opening upwardly.

It will be observed from Figures 4 to 6, inclusive, that the lateral marginal flanges 12 are creased to define vertically-extending ribs 15 at the lower portions of these flanges. In order to strengthen the flanges 12, they are turned back upon themselves, as at 12a (see Figures 3 and 4).

The terminal baking unit B is provided with a top plate 16 in which muffin receptacles 17 are fashioned. Downwardly-extending conical-shaped projections 18 are fashioned along the right-hand marginal section 16a of this top plate. These projections are adapted to be inserted into the sockets 14 when the section 16a overlaps the section 10a, and thus the two plates are detachably anchored together. At this time, the upper surfaces of the plates 10 and 16 are coplanularly disposed with respect to one another.

As disclosed in Figures 1 and 3, the terminal baking unit B further defines lateral marginal flange portions 19 and an end flange portion 20. In reality, the portions 19 and 20 provide a continuous flange extending around two opposing sides and one end of the unit B. The lower end of the flange thus defined is turned back upon itself, as at 21, to reinforce the unit B.

For the purpose of removably interconnecting the flanges 12 and 19 when the latter overlap the former, we provide vertical recesses 22 in the flanges 19, which snap over the ribs 15 previously mentioned.

The terminal baking unit C follows the same general construction as the unit B; accordingly, like reference numerals have been applied to corresponding parts. In this case, conical-shaped projections 23 on the right-hand marginal section 10a' of central unit A extend downwardly into upwardly-opening conical sockets 24 provided in the left-hand marginal section 16a' of the terminal unit C. The same rib 15 and recess 22 snap connection is provided between the flange portions 19 of the unit C and the flanges 12 of the unit A, as described hereinbefore.

When the units A and B are interconnected, the flanges 12 on the former are arranged coplanularly with the flange portions 19 of the latter. The same applies upon interconnecting the units A and C.

Of course, the ribs 15 and recesses 22 could extend inwardly relative to the baking units, if desired; this would amount to mere reversal of the directions in which these parts extend in Figures 5 and 6 of the drawing.

Summary

Having thus described the various parts of our multiple-unit muffin pan, the assembling and use thereof are summarized briefly as follows:

Assuming that six muffins are to be baked, the units A, B and C are selected. In attaching the units A and B together, the top plate 16 of the unit B is brought into overlapping relation with respect to the top plate 10 of the unit A, and the projections 18 are inserted into the sockets 14 (see dot-dash lines in Figure 4).

Now the plate 16 is swung downwardly until its upper surface is disposed in the plane of the plate 10. At the same time, the vertical recesses 22 are snapped over the ribs 15. Thus the overlapped sections 10a and 16a are detachably anchored together by the projections 18 and sockets 14, while the flanges 12 and 19 are removably interconnected by the ribs 15 and recesses 22 (see Figure 6).

In a like manner, the terminal unit C is connected to the central unit A by first inserting the marginal section 16a' of the unit C underneath the marginal section 10a' of the unit A; engaging the projections 23 in the sockets 24; and thereafter snapping the marginal flanges 12 over the flange portions 19 of the unit C.

It is quite apparent that the terminal units B and C may be connected directly together, omitting the central unit A, in which case the projections 18 would fit into the sockets 24. Also, additional central units C may be added to enlarge the pan. From Figure 4, it will be seen that the central baking unit A is provided with a plurality of conical-shaped sockets 14 along its left-hand section 10a, while the opposite section 10a' is fashioned with a plurality of depending conical-shaped projections 23 arranged there along. The flanges 12, 19 and 20 provide a reinforcing apron extending entirely around the perimeter of the assembled muffin pan, which slopes outwardly to permit easy cleaning thereof.

We claim:

1. In a multiple-unit muffin pan: at least a pair of baking units defining muffin receptacles; each unit providing a top plate having marginal flanges depending therefrom; the top plate and flanges of one unit being telescoped and overlapped relative to the top plate and flanges, respectively, of the other unit; means for detachably anchoring the overlapped top plates together; and means removably interconnecting the overlapped flanges.

2. In a multiple-unit muffin pan: at least a pair of baking units defining muffin receptacles; each unit providing a top plate having marginal flanges depending therefrom; the top plate and flanges of one unit being telescoped and overlapped relative to the top plate and flanges, respectively, of the other unit; means for detachably anchoring the overlapped top plates together; and means removably interconnecting the overlapped flanges; the outer surface of each overlapped pair of flanges being coplanularly disposed with respect to each other.

3. In a multiple-unit muffin pan: at least a pair of baking units defining muffin receptacles; each unit providing a top plate having marginal flanges depending therefrom; the top plate and flanges of one unit being telescoped and overlapped relative to the top plate and flanges, respectively, of the other unit; means for detachably anchoring the overlapped top plates together; and means removably interconnecting the overlapped flanges; the flanges extending downwardly and outwardly relative to the top plates of the units.

4. In a multiple-unit muffin pan: at least a pair of baking units defining muffin receptacles; each unit providing a top plate having marginal flanges depending therefrom; the top plate and flanges of one unit being telescoped and overlapped relative to the top plate and flanges, respectively, of the other unit; interfitting means for detachably anchoring the overlapped top plates together; and snap-means removably interconnecting the overlapped flanges.

5. In a multiple-unit muffin pan: at least a pair of baking units defining muffin receptacles; each unit providing a top plate having marginal flanges depending therefrom; the top plate and flanges of one unit being telescoped and overlapped relative to the top plate and flanges, respectively, of the other unit; the top plate of one unit having downwardly-extending sockets therein; the top plate of the other unit having projections thereon removably disposed in the sockets; the flanges of one unit being fashioned with ribs extending therefrom; and the flanges of the other unit having recesses snapped over the ribs.

HAROLD L. McCLAIN.
DOROTHY J. McCLAIN.

REFERENCES CITED

The following references are of record in the file of this patent:

UNITED STATES PATENTS

| Number | Name | Date |
|---|---|---|
| 1,336,292 | Goodfriend | Apr. 6, 1920 |
| 1,627,650 | Katzinger | May 10, 1927 |
| 2,219,487 | Nyden | Oct. 29, 1940 |
| 2,563,067 | Pyle | Aug. 7, 1951 |